United States Patent
Robinson

(10) Patent No.: US 11,178,805 B2
(45) Date of Patent: Nov. 23, 2021

(54) APPARATUS AND METHODS FOR VEHICLE STEERING TO FOLLOW A CURVED PATH

(71) Applicant: Deere & Company, Moline, IL (US)

(72) Inventor: William Daniel Robinson, Ames, IA (US)

(73) Assignee: Deere & Company, Moline, IL (US)

( * ) Notice: Subject to any disclaimer, the term of this patent is extended or adjusted under 35 U.S.C. 154(b) by 168 days.

(21) Appl. No.: 16/504,020

(22) Filed: Jul. 5, 2019

(65) Prior Publication Data
US 2021/0000004 A1 Jan. 7, 2021

(51) Int. Cl.
| A01B 69/04 | (2006.01) |
| G05D 1/02 | (2020.01) |
| B62D 15/02 | (2006.01) |

(52) U.S. Cl.
CPC ........ *A01B 69/008* (2013.01); *B62D 15/0295* (2013.01); *G05D 1/024* (2013.01); *G05D 1/0212* (2013.01); *G05D 1/0278* (2013.01); *B60W 2540/18* (2013.01); *B60W 2710/207* (2013.01); *G05D 2201/0201* (2013.01)

(58) Field of Classification Search
CPC ........ A01B 69/04; A01B 69/008; G05D 1/02; G05D 1/0278; B62D 15/02; B62D 15/0295; B62D 15/024
See application file for complete search history.

(56) References Cited

U.S. PATENT DOCUMENTS

| 4,788,645 A | * | 11/1988 | Zavoli | G01C 21/28 340/988 |
| 7,077,232 B2 | * | 7/2006 | Correia | B62D 7/09 180/410 |
| 8,359,139 B2 | * | 1/2013 | Wang | A01B 69/007 701/50 |
| 2008/0249686 A1 | * | 10/2008 | Mikuriya | B62D 6/003 701/42 |
| 2009/0106990 A1 | * | 4/2009 | Harrill | B60G 9/003 33/288 |

(Continued)

FOREIGN PATENT DOCUMENTS

CN 105867377 B 1/2019

OTHER PUBLICATIONS

European Search Report issued in counterpart application No. 20182035.4 dated Nov. 16, 2020 (11 pages).

*Primary Examiner* — Tan Q Nguyen
(74) *Attorney, Agent, or Firm* — Hanley, Flight & Zimmerman, LLC

(57) ABSTRACT

Methods, apparatus, systems and articles of manufacture are disclosed for vehicle steering to follow a curved path. An example vehicle disclosed herein includes a front axle, a rear axle, a location sensor, and a tracking mode controller to determine a wheel steering angle based on a turn center location corresponding to a navigation curve and one or more measurements between the turn center location and the vehicle, determine a heading error offset adjustment based on the turn center location and the one or more measurements between the turn center location and the vehicle, and cause the vehicle to move along the navigation curve based on the wheel steering angle and the heading error offset adjustment.

20 Claims, 8 Drawing Sheets

(56) References Cited

U.S. PATENT DOCUMENTS

| | | | |
|---|---|---|---|
| 2014/0253722 A1* | 9/2014 | Smyth | H04N 5/23296 |
| | | | 348/135 |
| 2014/0277954 A1* | 9/2014 | Nelson, Jr. | A01C 21/00 |
| | | | 701/50 |
| 2017/0355398 A1 | 12/2017 | Dix et al. | |
| 2018/0002882 A1* | 1/2018 | Stromsoe | E01C 21/00 |
| 2018/0088590 A1 | 3/2018 | Zhu et al. | |

* cited by examiner

APPARATUS AND METHODS FOR VEHICLE STEERING TO FOLLOW A CURVED PATH

FIELD OF THE DISCLOSURE

This disclosure relates generally to vehicle steering, and, more particularly, to apparatus and methods for vehicle steering to follow a curved path.

BACKGROUND

In recent years, agricultural vehicles have become increasingly automated. Agricultural vehicles may semi-autonomously or fully-autonomously drive and perform operations on fields using implements for planting, spraying, harvesting, fertilizing, stripping/tilling, etc. These autonomous agricultural vehicles include multiple sensors (e.g., Global Navigation Satellite Systems (GNSS), Global Positioning Systems (GPS), Light Detection and Ranging (LIDAR), Radio Detection and Ranging (RADAR), Sound Navigation and Ranging (SONAR), telematics sensors, etc.) to help navigate without the assistance, or with limited assistance, from human users.

BRIEF DESCRIPTION OF THE DRAWINGS

The figures are not to scale. In general, the same reference numbers will be used throughout the drawing(s) and accompanying written description to refer to the same or like parts.

Figure 1:
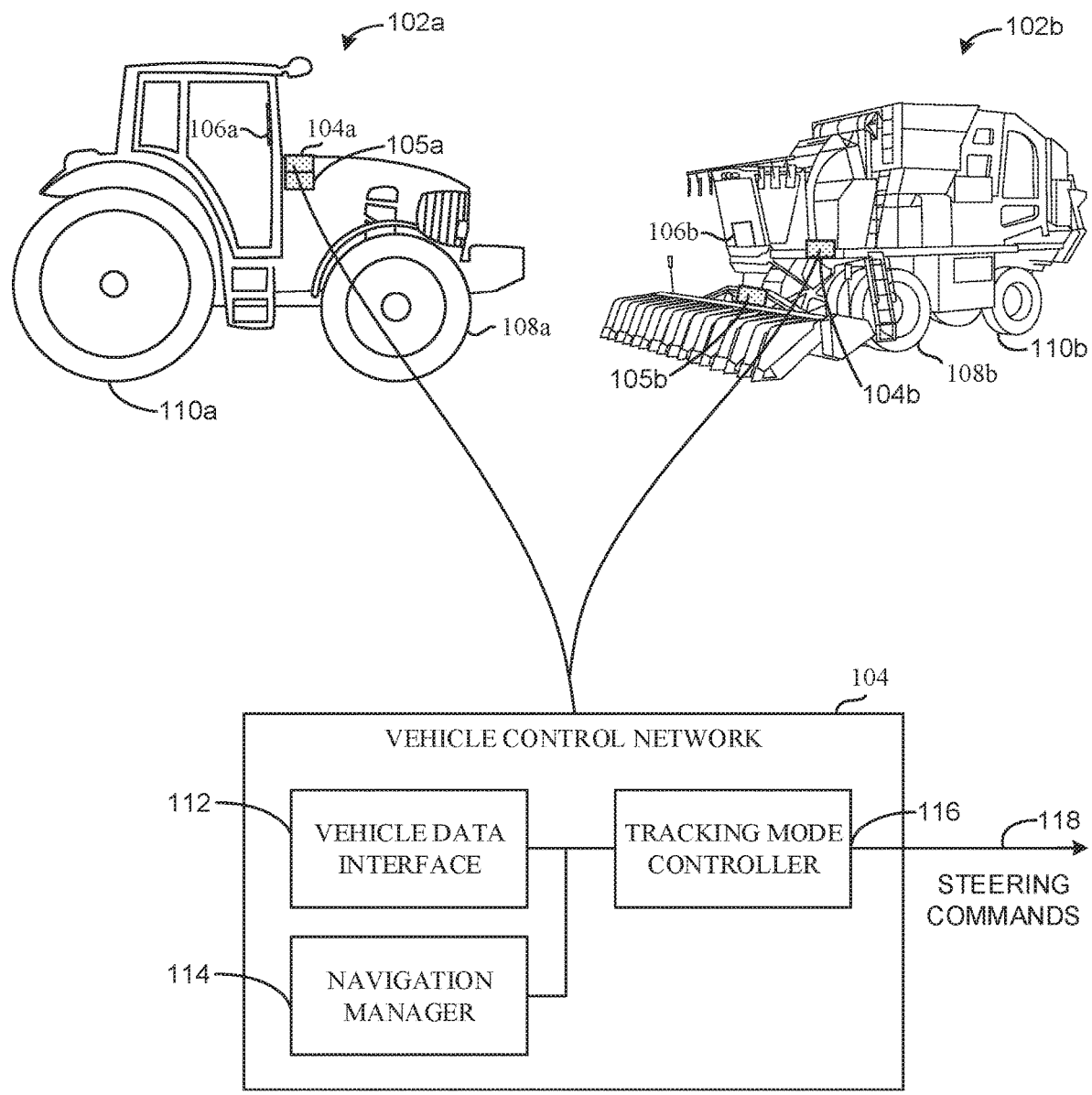
FIG. 1 is a schematic illustration of an example front wheel steer vehicle and an example rear wheel steer vehicle constructed in accordance with teachings disclosed herein.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Automation of agricultural vehicles is highly commercially desirable, as automation can improve the accuracy with which operations are performed, reduce operator fatigue, improve efficiency, and accrue other benefits. Automated vehicles move by following guidance lines. Conventional methods to generate guidance lines include using feedback control systems that rely on control parameters, and/or controller gains, to control a system. For example, such control parameters include proportional-integral-derivative (PID) controllers. Such conventional controllers require at least three control parameters (e.g., controller gains) to control the vehicle in a particular mode of operation. A controller may have many different modes of operation including an acquisition mode of operation and a tracking mode of operation. As used herein, "tracking," "tracking mode," "tracking mode of operation," and/or their derivatives refer to following and/or tracking a guidance line. As used herein, "acquisition," "acquisition mode," "acquisition mode of operation," and/or their derivatives refer to getting to the guidance line, the path, and/or acquiring a position that is substantially similar to (e.g., within one meter of, within a half meter of, within two meters of, etc.) the guidance line.

Guidance lines are used by a navigation and/or location apparatus e.g., a GNSS receiver) and a controller in tracking mode for a vehicle to follow a prescribed path. In some examples, the prescribed path includes turns, curves, etc., for the vehicle to follow when operating in a field. When using conventional design methods, in order to design a satisfactory controller that can reliably track a prescribed curved path, many hours of vehicle operation, such as driving the vehicle in circles of different path curvatures, are required to adjust the control parameters to determine multiple datasets of control parameters that can be used by a conventional controller to build/design tables of control parameters (e.g., wheel angle come ds versus path curvature) to cause a GNSS receiver to track a prescribed curved path. For example, tables were conventionally used to provide feedforward wheel angle commands based on path curvature values. As used herein, a "wheel angle command," "steering angle command," "feedforward wheel angle command," etc., is a control signal that determines the angle at which the wheels of the vehicle should turn to follow a prescribed path (e.g., a curved path). In addition, when a vehicle operator puts the vehicle into situations outside of the designed control parameters defined in the tables, performance may be significantly degraded, since the control parameters need to be determined by interpolating between values in the tables. In such examples, the vehicle will be less likely to accurately and precisely follow the prescribed curved path.

Each control parameter is a function of the vehicle position with respect to the guidance line. Thus, during the design period, each of the control parameters must be individually tuned for a preset number of speeds and a preset number of distances from the guidance line. In situations when the vehicle is experiencing slippage, soft versus hard soil, field roughness, etc., conventional methods design one or more control gain values which are tuned based on errors in the control parameters and adjust (e.g., drive) all errors to zero in order to compensate for the undesirable field conditions/situations. For example, control gain values are tuned based on measured lateral error perpendicular to the path, measured heading error relative to the path heading error, and rate of change of the heading error relative to the path rate of change of heading error. Heading error refers to a difference between a line tangent to a navigation curve at a current location of the GPS receiver, and a current heading (directional orientation) of a vehicle. In conventional implementations, the heading error may be driven to zero. However, to follow a prescribed curved path, a heading error offset must not be driven to zero, otherwise performance degrades.

Additionally, conventional controllers must include substantial memory allocated for the control parameter datasets for each mode of operation. For example, if the conventional controller is in tracking mode, a table with a plurality of values corresponding to front wheel angles of a prescribed curved path and rear wheel angles for the prescribed curved path, are stored in the controller memory. In addition to the already large memory required for each table that is stored, additional logic overhead is required to maintain, read, and write to the memory. With multiple different modes of operation, the amount of data required by a conventional controller to reliably control a vehicle can easily enter the range of kilobits and megabits.

Unlike conventional methods of control, the examples disclosed herein reduce the memory required to operate a controller in tracking mode by eliminating the need to experimentally develop tables of values to determine the correct feedforward commanded wheel angle required to follow a curved path. Further, examples disclosed herein do not require field tuning. The wheel angle to utilize to follow a curved path is determined based on a formula that may be implemented by machine readable instructions. Examples disclosed herein enable a location sensor (e.g., GNSS receiver, GPS receiver, etc. to stay positioned on a curved path even when the location sensor is offset from the front axle or the rear axle. For example, on a rear wheel steer vehicle, the location sensor may be positioned closer to a front end of the vehicle than the front axle, and on a front wheel steer vehicle, the location sensor may be positioned in between the rear axle and the front axle.

Example methods, apparatus, systems, and articles of manufacture (e.g., physical storage media) disclosed herein describe an efficient method to determine, in real-time, a feedforward wheel angle command for a front wheel steer or rear wheel steer vehicle. For example, examples disclosed herein obtain the desired path curvature in real-time, along with vehicle parameters and navigation path data to determine the correct wheel angle command for the vehicle.

Example methods, apparatus, systems and articles of manufacture (e.g., physical storage media) disclosed herein determine a heading error offset adjustment to enable to improve tracking performance when the vehicle is following a curved path. By utilizing the vehicle heading offset adjustment disclosed herein, the same control gain values utilized for straight line tracking can be utilized for curved path tracking.

Example methods, apparatus, systems and articles of manufacture (e.g., physical storage media) disclosed herein utilize the determined feedforward wheel angles and vehicle heading error offset adjustments to ensure that a location sensor (e.g., GNSS receiver) stays on a prescribed path, regardless of where the location sensor is positioned on the vehicle.

To efficiently track a prescribed curved path, examples disclosed herein utilize machine kinematics and geometric principles to determine the commanded steering angle to cause the vehicle to turn according to the curved path. In some examples, the vehicle may turn in one direction, or the vehicle may follow an S-shaped curve, therefore turning in two different directions. Examples disclosed herein utilize data, such as path curvature data, received in real-time to calculate the correct angle in which to steer the front wheels of the vehicle, regardless if the direction of travel changes.

FIG. 1 is a block diagram of an example front wheel steer vehicle 102a and an example rear wheel steer vehicle 102b. In the illustrated example, both the front wheel steer vehicle 102a and the rear wheel steer vehicle 102b include an example vehicle control network 104a,b to guide the front wheel steer and rear wheel steer vehicles 102a, 102b.

The front wheel steer vehicle 102a includes the vehicle control network 104a, an example location sensor 105a, an example user display 106a, an example front wheel 108a, and an example rear wheel 110a.

The rear wheel steer vehicle 102b includes the vehicle control network 104h, an example location sensor 105b, an example user display 106b, an example front wheel 108b, and an example rear wheel 110b.

As illustrated and described herein, the structure and/or fiction of any one of the vehicle control network 104b, the location sensor 105b, the user display 106b, the front wheel 108b, and/or the rear wheel 110b, may be the same as the corresponding component on the front wheel steer vehicle 102a. Therefore, for example, description and/or illustration associated with the user display 106a of the front wheel steer vehicle 102a can be considered to apply equally to the user display 106b of the rear wheel steer vehicle 102b. As used herein, when referring to "the vehicle 102," it is to be understood that the description and/or illustration applies to both the front wheel steer vehicle 102a and the rear wheel steer vehicle 102b. Similarly, when referring to any one or more of the components of the front wheel steer vehicle 102a or the rear wheel steer vehicle 102b, if a component is discussed (e.g., the vehicle control network 104, the location sensor 105, the user display 106, the front wheel 108, the rear wheel 110, etc.), it is to be understood that the illustration and/or description applies to these respective parts on both of the front wheel steer vehicle 102a and the rear wheel steer vehicle 102b.

In the example illustrated in FIG. 1, the front wheel steer vehicle 102a is a tractor and the rear wheel steer vehicle 102b is a cotton stripper. The front wheel steer vehicle 102a and the rear wheel steer vehicle 102b may be any type of vehicle (e.g., a tractor, front loader, harvester, cultivator, or any other suitable vehicle) configured to track a projected path and/or curved path. For example, the front wheel steer vehicle 102a may be a tractor capable of automatically tracking a row of crops to harvest the row of crops. As used herein, a front wheel steer vehicle (such as the front wheel steer vehicle 102a) steers by rotating its front wheels, (such as the front wheel 108a), while a rear wheel steer vehicle (such as the rear wheel steer vehicle 102b) steers by rotating its rear wheels (such as the rear wheel 110b). In examples disclosed herein, the vehicle 102 is equipped with the vehicle control network 104 to control and/or otherwise command the vehicle 102 to acquire and/or track a predetermined path. The vehicle control network 104 is explained in further detail below with respect to the components in the vehicle control network 104.

In FIG. 1, the example user display 106 included of the vehicle 102 is an interactive display on which a user may select and/or enter desired inputs (e.g., select a screen display, enter desired vehicle speed, enter aggressiveness variables, select the sampling interval, power on and/or off the vehicle, etc.) before, during, and/or after operation of the vehicle 102. Additionally, the example user display 106 is utilized to display the prescribed path to a user operating the vehicle 102. In some examples disclosed herein, the user display 106 is a liquid crystal display (LCD) touch screen such as a tablet, a Generation 4 CommandCenter™ Display, a computer monitor, etc. The user display 106 of the illustrated example can be used to display navigation path data and/or vehicle location data.

In the example illustrated in FIG. 1, the front and rear wheel steer vehicles 102a,b includes the front wheels 108a,b and the rear wheels 110a,b. In FIG. 1, the front wheel steer vehicle 102a turns in response to a rotation of the front wheel 108a. For example, if the user decides to turn left, the front wheel 108a is rotated to the left. The rear wheel steer vehicle 102b turns in response to a rotation of the rear wheel 110b. In examples disclosed herein, the front wheels 108a,b are located on a front wheel axle with one or more additional corresponding front wheels. Likewise, in examples disclosed herein, the rear wheel 110a is located on a rear wheel axle with one or more additional corresponding rear wheels.

The vehicle control network 104 includes an example vehicle data interface 112, an example navigation manager 114, and an example tracking mode controller 116.

In FIG. 1, the example vehicle control network 104 includes the example vehicle data interface 112 to provide information to the example tracking mode controller 116 corresponding to vehicle data, such as measurements of vehicle parts, distances between relative areas of vehicle, etc. In some examples, the vehicle data interface 112 may include preset and/or predetermined values, measurements, distances, of the vehicle 102. The example vehicle data interface 112 may require user input before operation of the vehicle can occur, in order to correctly operate in tracking mode. In other examples, the vehicle data interface 112 may be a memory, such as the non-volatile memory 816 or the local memory 813 of FIG. 8, which receives a notification from the tracking mode controller 116 when the tracking mode controller 116 requires vehicle data to determine the commanded steering angle of the vehicle.

In the example illustrated in FIG. 1, the navigation manager 114 of the vehicle control network 104 of FIG. 1 accesses navigation data from the location sensor 105. The vehicle control network 104 may include one or more electronic and/or hardware components to support the vehicle data interface 112, the navigation manager 114, and/or the tracking mode controller 116. For example, the navigation manager 114 can access navigation path data indicating one or more curves that the vehicle 102 is to follow to perform a field operation. In some examples, the navigation manager 114 accesses current location data corresponding to a location of the location sensor 105. The navigation manager 114 communicates navigation and/or location data to the tracking mode controller 116.

In some examples, the location sensor 105 is part of (e.g., integrated in) the vehicle control network 104a. In some examples the location sensor 105 is located separate from the vehicle control network 104 on the vehicle 102. However, even when the location sensor 105 is separate from the vehicle control network 104, it is still in communication (e.g., wired or wirelessly) with the vehicle control network 104.

In the illustrated example of FIG. 1, the location sensor 105a on the front wheel steer vehicle 102a is positioned between the rear wheel 110 and the front wheel 108 (e.g., between the front axle and the rear axle). In the illustrated example of FIG. 1, the location sensor 105b on the rear wheel steer vehicle 102b is located closer to a front end of the vehicle than the front wheel 108b or the front axle. In other examples, the location sensor 105 may be located at any position on the vehicle 102 and/or may be integrated into another component (e.g., the navigation manager 114).

The location sensor 105 communicates with the navigation manager 114 and/or the tracking mode controller 116 to provide and/or otherwise transmit a geographical location of the vehicle 102 and/or navigation path data. In some examples disclosed herein, the location sensor 105 samples the geographical location of the vehicle 102 at a threshold interval. For example, every 0.1 seconds, the location sensor 105 may send the geographical location of the vehicle 102 to the vehicle control network 104. In examples disclosed herein, the location sensor 105 may communicate with the tracking mode controller 116 to obtain the desired path in which the vehicle 102 is to travel. In some examples disclosed herein, the location sensor 105 is a GNSS receiver controller, a GPS receiver, a GPS receiver controller, and/or any other component capable of sensing and/or determining location information.

In some examples, the location sensor 105 determines when the vehicle 102 is approaching a curved path based on navigation path data and provides a signal, notification, etc., to the vehicle control network 104. For example, the location sensor 105 may include a memory which receives and stores data corresponding to predetermined path information in which the vehicle 102 is to follow to keep the location sensor 105 on the predetermined path. In some examples, the location sensor 105 is in communication with the tracking mode controller 116 to provide location data and predetermined path data for the tracking mode controller 116 (e.g., via the navigation manager 114).

During tracking mode, the vehicle control network 104 calculates a lateral error of the vehicle 102, a heading error of the vehicle 102, a rate of change of the heading error of the vehicle 102, and a path curvature measurement of the vehicle 102. For example, because during tracking mode the vehicle 102 may or may not be at the geographical location corresponding to the curved path, the straight path, or the start position of the path, the vehicle control network 104 may calculate the lateral error. In examples disclosed herein, the lateral error is the shortest distance between the location sensor 105 and the desired path. In another example, the lateral error may be defined as the distance, perpendicular to the path, to the location sensor 105.

In examples disclosed herein, the heading of the vehicle 102, also referred to as the "yaw" of the vehicle 102, is defined as the direction in which the vehicle 102 is pointing. For example, the heading can be drawn by a straight line, starting from the front of the vehicle 102 and extending in the direction the vehicle is traveling. Further, the heading error can be defined as the distance or angle between a tangent line to a prescribed path a specific location and the actual heading of the vehicle.

In examples disclosed herein, the path curvature is the defined as the curvature of a path which the vehicle 102 is to follow. The path curvature is predetermined, before the vehicle is in motion and performing an operation (e.g., seeding, fertilizing, etc.). The path curvature is stored in navigation path data for use by the example tracking mode controller 116 when determining the commanded steering angle and heading error offset adjustment that causes the vehicle 102 to follow the prescribed curved path.

The tracking mode controller 116 of the illustrated example calculates a wheel steering angle (e.g., a front wheel steering angle for the front wheel steer vehicle 102a and/or a rear wheel steering angle for the rear wheel steer vehicle 102b) and/or a heading error offset adjustment value to cause the vehicle 102 (more specifically, the location sensor 105 of the vehicle 102) to follow a predetermined curve represented in navigation data. In some examples disclosed herein, the wheel steering angle is a numerical value representative of the angular measurement (e.g., 14 degrees, negative 30 degrees, etc.) to apply the front wheel 108a for the front wheel steer vehicle 102a or the rear wheel 110b for the rear wheel steer vehicle 102b. The tracking mode controller 116 of the illustrated example outputs one or more example steering commands 118 to cause the steering wheels of the vehicle 102 to move to keep the location sensor 150 on the predetermined curve.

In some examples, the tracking mode controller 116 attempts to drive all errors (e.g., lateral error, heading error, etc. errors relative to a navigation path to zero with the use of tracking mode controller gains to force the location sensor 105 to precisely follow a prescribed path. For example, when the errors are zero, the location sensor 105 is accurately following the path. However, in some examples, the example tracking mode controller 116 does not attempt to drive the heading error to zero when the vehicle 102 is to follow a curved path. Instead, in some such examples disclosed herein, the tracking mode controller 116 determines a heading error offset adjustment to apply to the tracking mode controller heading error gain to follow the curved path. Further detail of example tracking mode controller 116 is described in below in connection with FIG. 2.

In some examples, the one or more steering commands generated by the tracking mode controller 116 are provided to a steering apparatus on the vehicle 102. For example, the tracking mode controller 116 can issue steering commands to a front wheel steering apparatus of the front wheel steer vehicle 102a. Similarly, the tracking mode controller 116 can issue steering commands to a rear wheel steering apparatus of the rear wheel steer vehicle 102b.

Figure 2:
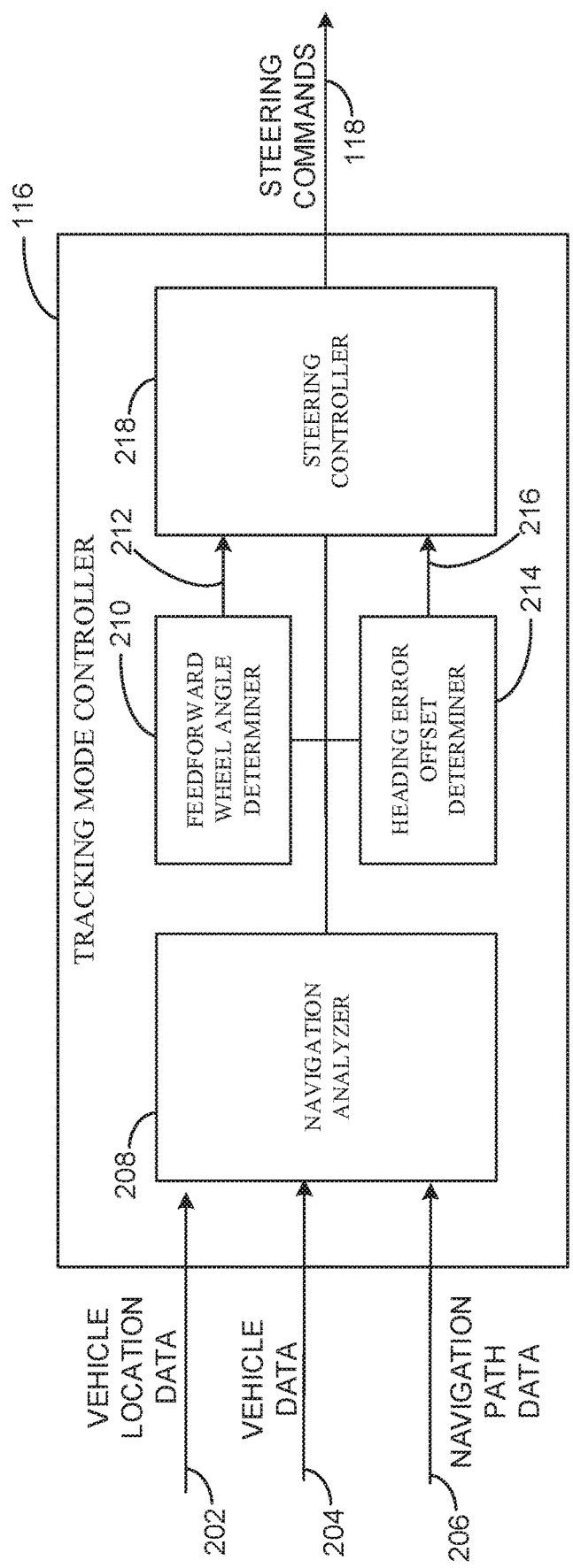
FIG. 2 is a block diagram of an example tracking mode controller of the front wheel and rear wheel steer vehicles of FIG. 1.

FIG. 2 is a block diagram of the example tracking mode controller 116 of the front wheel and rear wheel steer vehicles 102a,b of FIG. 1. The tracking mode controller 116 includes an example navigation analyzer 208, an example feedforward wheel angle determiner 210, an example heading error offset determiner 214, and an example steering controller 218.

The navigation analyzer 280 of the illustrated example of FIG. 2 accesses example vehicle location data 202. For example, the navigation analyzer 208 can access the vehicle location data 202 from the location sensor 105 of the vehicle 102. The vehicle location data 202 may include a location for the location sensor 105 and/or location data specific to a particular portion of the vehicle (e.g., a location of a front axle, a location of a rear axle, etc.). In some examples, the navigation analyzer 208 determines a location of a particular component or portion of the vehicle 102 based on the vehicle location data 202 and example vehicle data 204 (e.g., dimensions and relative positions on the vehicle 102).

The navigation analyzer 208 of the illustrated example accesses vehicle data 204 from the vehicle data interface 112. In some examples, the vehicle data includes dimensions of a vehicle or other parameters (e.g., current speed, turning capabilities, etc.) of a vehicle. The navigation analyzer 208 can determine locations of specific portions of the vehicle (e.g., a location of a front axle, a location of a rear axle, etc.) based on the vehicle data 204 and/or the vehicle location data 202.

The navigation analyzer 208 of the illustrated example accesses example navigation path data 206 including one or more curves for the vehicle 102 to follow. For example, the navigation path data 206 may include one or more guidance lines. In some examples, the navigation analyzer 208 determines specific characteristics of the navigation path data 206, such as a curvature value based on a current location in the path as determined from the vehicle location data 202. The navigation analyzer 208 of the illustrated example communicates the vehicle location data 202, the vehicle data 204, and/or the navigation path data 206 to the feedforward wheel angle determiner 210, the heading error offset determiner 214, and/or the steering controller 218.

The feedforward wheel angle determiner 210 of the illustrated example of FIG. 2 determines an example wheel steering angle 212 to keep the vehicle 102 on a curved navigation path. In the case of a rear wheel steer vehicle, the feedforward wheel angle determiner 210 outputs an angle to which the rear wheel should be moved to stay on the curved navigation path. In the case of a front wheel steer vehicle, the feedforward wheel angle determiner 210 outputs an angle to which the front wheel should be moved to stay on the curved navigation path. In some examples, the feedforward wheel angle determiner 210 determines a wheel steering angle to keep the location sensor 105 on the curved navigation path.

In some examples, the feedforward wheel angle determiner 210 utilizes the following equations 1-4 to determine a wheel steering angle to be utilized by the steering controller 218.

In some examples, using equation 1, the feedforward wheel angle determiner 210 can determine a turn radius from a turn center location to a location of the location sensor 105. The variable "$R_{rec}$" refers to the turn radius from the turn center location to the location sensor 105 and "p" refers to the path curvature, as determined based on the navigation path data (e.g., reported by a GPS receive).

$$R_{rec} = \frac{1}{|\rho|} \qquad \text{Equation 1}$$

In some examples, using equations 2a or 2b, the feedforward wheel angle determiner 210 determines a turn radius from the turn center location to an axle of the vehicle. If the vehicle 102 is a rear wheel steer vehicle, the feedforward wheel angle determiner 210 calculates a turn radius from the turn center location to the front axle of the vehicle 102 using equation 2a. If the vehicle 102 is a front wheel steer vehicle, the feedforward wheel angle determiner 210 calculates a turn radius from the turn center location to the a axle of the vehicle 102 using equation 2b. In equation 2a, $R_{fa}$ represents the turn radius from the turn center location to the front axle and $L_{fa-rec}$ represents a distance between the front axle and the location sensor 105. In equation 2b, $R_{ra}$ represents the turn radius from the turn center location to the rear axle and $L_{ra-rec}$ represents a distance between the rear axle and the location sensor 105.

$$R_{fa} = \sqrt{R_{rec}^2 - L_{fa-rec}^2} \qquad \text{Equation 2a}$$

$$R_{ra} = \sqrt{R_{rec}^2 - L_{ra-rec}^2} \qquad \text{Equation 2b}$$

The feedforward wheel angle determiner 210 can utilize equation 3a for a rear wheel steer vehicle to determine an angle between the rear axle turn radius and the centerline of the vehicle. The feedforward wheel angle determine 210 can utilize equation 3b for a front wheel steer vehicle to determine an angle between the front axle turn radius and the centerline of the vehicle. In both equations, WB represents the distance between the front and rear axles.

$$\alpha = \tan^{-1}\left(\frac{R_{fa}}{WB}\right) \qquad \text{Equation 3a}$$

$$\alpha = \tan^{-1}\left(\frac{R_{ra}}{WB}\right) \qquad \text{Equation 3b}$$

The feedforward wheel angle determiner 210 can utilize equation 4 to calculate the feedforward wheel steering angle (e.g., the wheel steering angle 212). In equation 4, the sign function is utilized for the assumed angle sign convention in the controller.

$$\delta = (90° - \alpha) \times \text{sign}(\rho) \qquad \text{Equation 4}$$

Equations 1-5 represent one technique the feedforward wheel angle determiner 210 can utilize to calculate the feedforward steering angle. However, the feedforward wheel angle determiner 210 can utilize any calculations to leverage the vehicle location data 202, the vehicle data 204, and/or the navigation path data 206 from the navigation analyzer, or parameters derived from these data sources, to calculate a wheel angle to enable the location sensor 105 to stay on a prescribed curved path. The feedforward wheel angle determiner 210 communicates the wheel steering angle 212 to the steering controller 218 to cause the vehicle to move based on the wheel steering angle 212. Example schematics of calculating a feedforward wheel angle are illustrated and described in connection with FIGS. 6A-6B.

The heading error offset determiner 214 calculates an example heading error offset adjustment 216. In some examples, the heading error offset determiner 214 accesses one or more of the vehicle location data 202, the vehicle data 204, and/or the navigation path data 206 to calculate the heading error offset adjustment 216. The heading error offset determiner 214 communicates the heading error offset adjustment 216 to the steering controller 218 to cause the steering controller 218 to reduce a heading error value until the vehicle 102 is oriented according to the heading error offset adjustment 216.

The heading error offset determiner 214 of the illustrated example utilizes equation 1 and equations 6 and 7 to calculate the heading error offset adjustment 216. Equation 1, previously described and reprinted below for reference, enables the heading error offset determiner 214 to determine a turn radius from a turn center location to the location sensor 105 based on a radius of curvature represented in the navigation path data 206 and/or the vehicle location data 202.

$$R_{rec} = \frac{1}{|\rho|} \qquad \text{Equation 1}$$

The heading error offset determiner 214 of the illustrated example utilizes equation 5a to calculate a desired heading error value for a rear wheel steer vehicle. In equation 5a, $L_{fa-rec}$ represents a distance between the front axle and the location sensor 105. The heading error offset determiner 214 of the illustrated example utilizes equation 5b to calculate a desired heading error value for a front wheel steer vehicle, where $L_{ra-rec}$ represents a distance between the rear axle and the location sensor 105.

$$\theta_{des} = -\sin^{-1}\left(\frac{L_{fa-rec}}{R_{rec}}\right) \times \text{sign}(\rho) \qquad \text{Equation 5a}$$

$$\theta_{des} = -\sin^{-1}\left(\frac{L_{ra-rec}}{R_{rec}}\right) \times \text{sign}(\rho) \qquad \text{Equation 5b}$$

The heading error offset determiner 214 of the illustrated example utilizes equation 6 to calculate the heading error offset adjustment 216. In equation 6, $\theta_{meas}$ represents the measured heading error as reported by the location sensor 105 and/or the navigation analyzer 208. In equation 6, $\theta_{adj}$ represents the heading error offset adjustment 216.

$$\theta_{adj} = \theta_{meas} - \theta_{des} \qquad \text{Equation 6}$$

The heading error offset determiner 214 communicates the heading error offset adjustment 216 to the steering controller 218. By subtracting the desired heading error ($\theta_{des}$) from the measured heading error ($\theta_{meas}$), the steering controller 218 can utilize the heading error offset adjustment 216 to reduce the heading error until the heading error corresponds to the desired heading error calculated using equation 5a or 5b. Example schematics of calculating a feedforward wheel angle are illustrated and described in connection with FIGS. 7A-7B.

The steering controller 218 of the illustrated example of FIG. 2 generates one or more of the steering commands 118 based on the wheel steering angle 212 and/or the heading error offset adjustment 216. In some examples, the steering controller 218 outputs a steering angle for a steering wheel (e.g., rear wheels for a rear wheel steer vehicle, front wheel steering angle for a front wheel steer vehicle) by utilizing the wheel steering angle 212 and/or modifying the wheel steering angle 212 in view of the heading error offset adjustment 216. In some examples, the steering controller 218 compares the vehicle location data 202 with the navigation path data 206 to determine errors relative to the curved navigation path (e.g., lateral error, heading error, etc.). In some such examples, the steering controller 218 generates the steering commands 118 to reduces these errors. When generating the steering commands 118, the steering controller 218 attempts to move the vehicle 102 to reduce the heading error to the desired heading value by utilizing the heading error offset adjustment 216. The steering controller 218 communicates the steering commands 118 to one or more steering apparatus. For example, the steering controller 218 can communicate the steering commands 118 to a front wheel steering apparatus on the front wheel steer vehicle 102a and/or to a rear wheel steering apparatus on the rear wheel steer vehicle 102b.

While an example manner of implementing the tracking mode controller 116 of FIG. 1 is illustrated in FIG. 2, one or more of the elements, processes and/or devices illustrated in FIG. 2 may be combined, divided, re-arranged, omitted, eliminated and/or implemented in any other way. Further, the example navigation analyzer 208, the example feedforward wheel angle determiner 210, the example heading error offset determiner 214, the example steering controller 218 and/or, more generally, the example tracking mode controller 116 of FIG. 2 may be implemented by hardware, software, firmware and/or any combination of hardware, software and/or firmware. Thus, for example, any of the example navigation analyzer 208, the example feedforward wheel angle determiner 210, the example heading error offset determiner 214, the example steering controller 218 and/or, more generally, the example tracking mode controller 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example navigation analyzer 208, the example feedforward wheel angle determiner 210, the example heading error offset determiner 214, and/or the example steering controller 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example tracking mode controller 116 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (a g., wired) communication and/or constant communication, but rather additionally includes selective communication at periodic intervals, scheduled intervals, aperiodic intervals, and/or one-time events.

Figure 3:
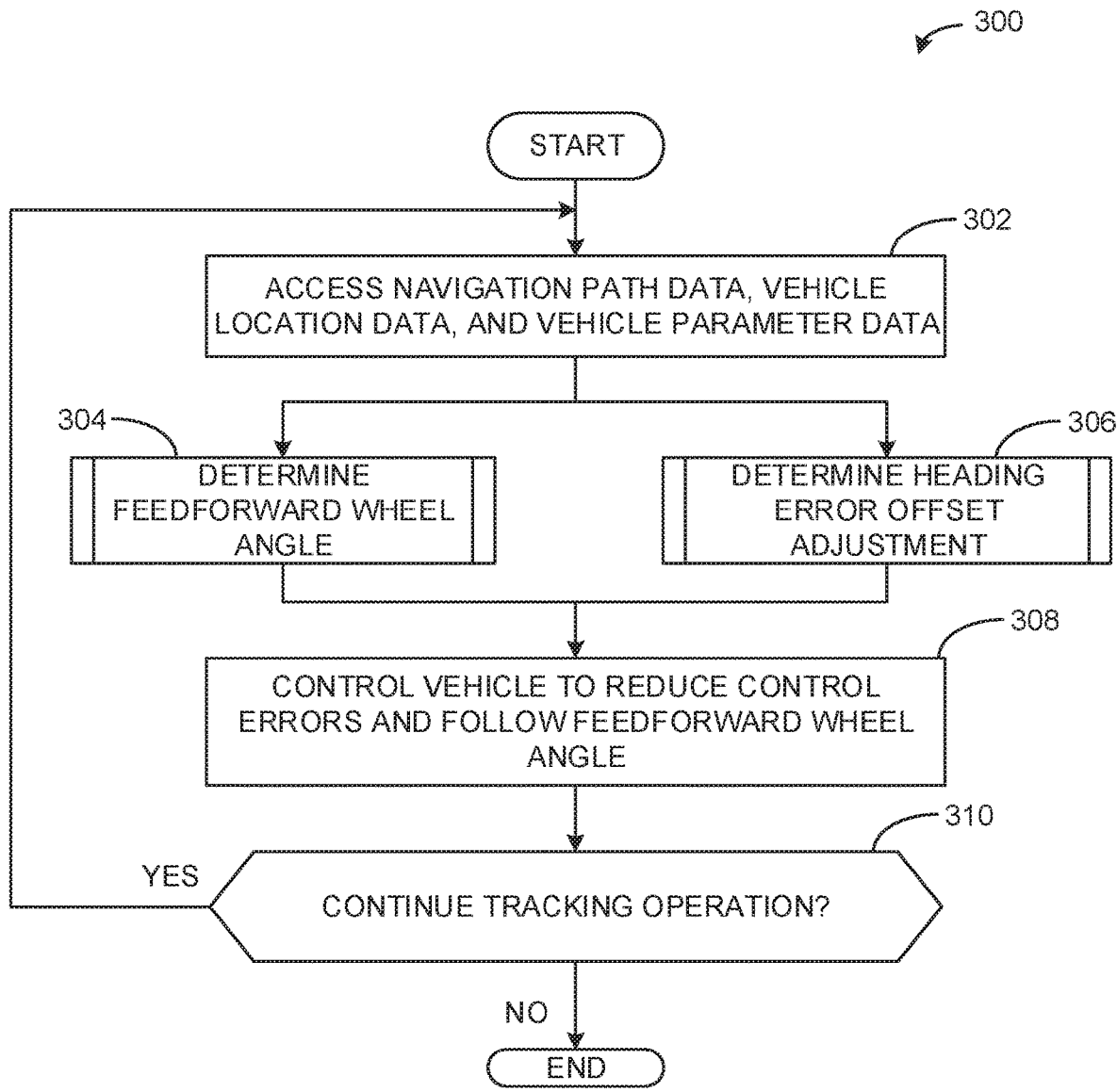
FIG. 3 is a flowchart representative of example machine readable instructions that may be executed to implement the tracking mode controller of FIG. 1 to cause a vehicle to follow a curved path.
Figure 4:
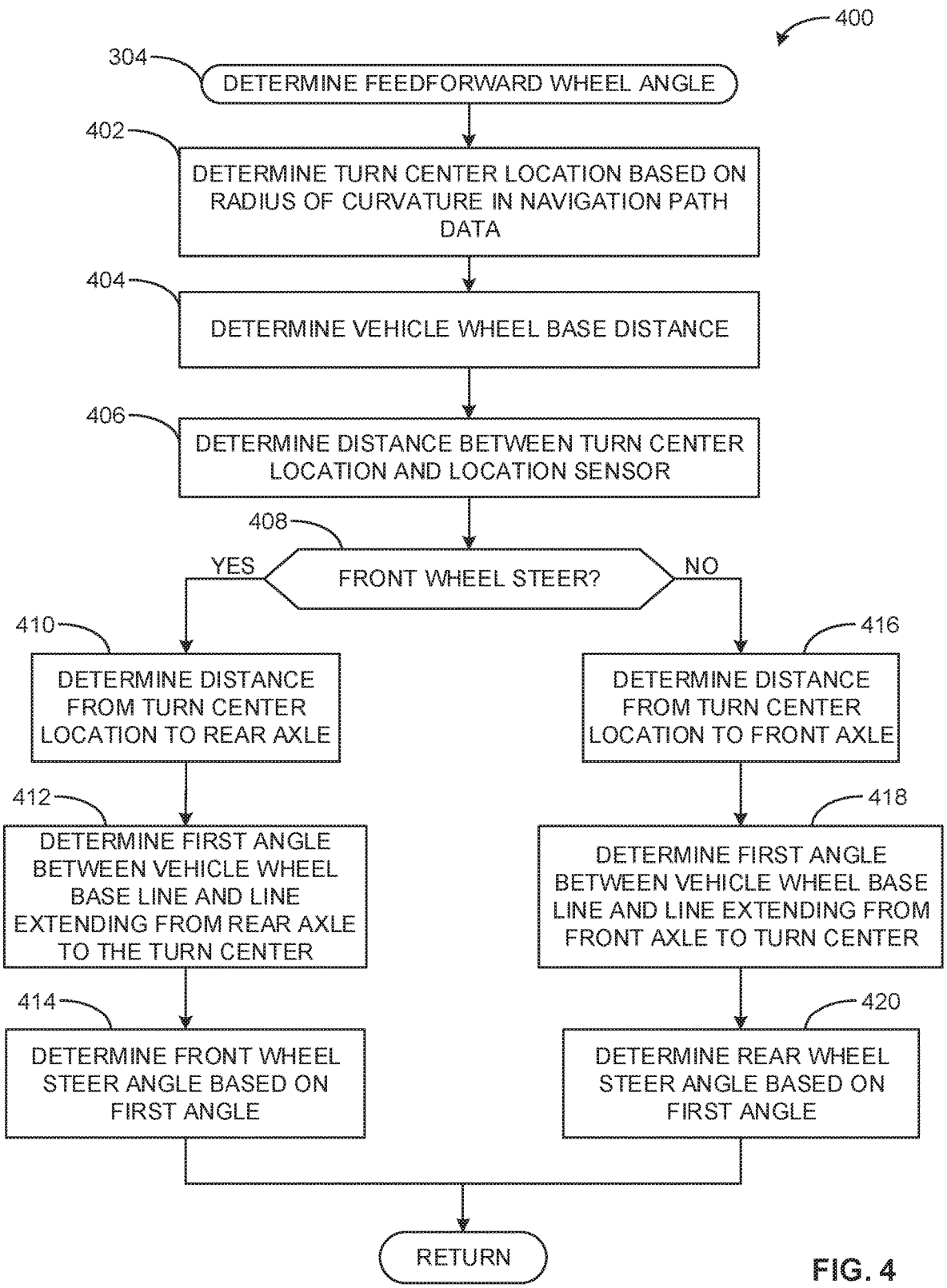
FIG. 4 is a flowchart representative of example machine readable instructions that may be executed to implement the tracking mode controller of FIG. 1 to determine a feedforward wheel angle.
Figure 5:
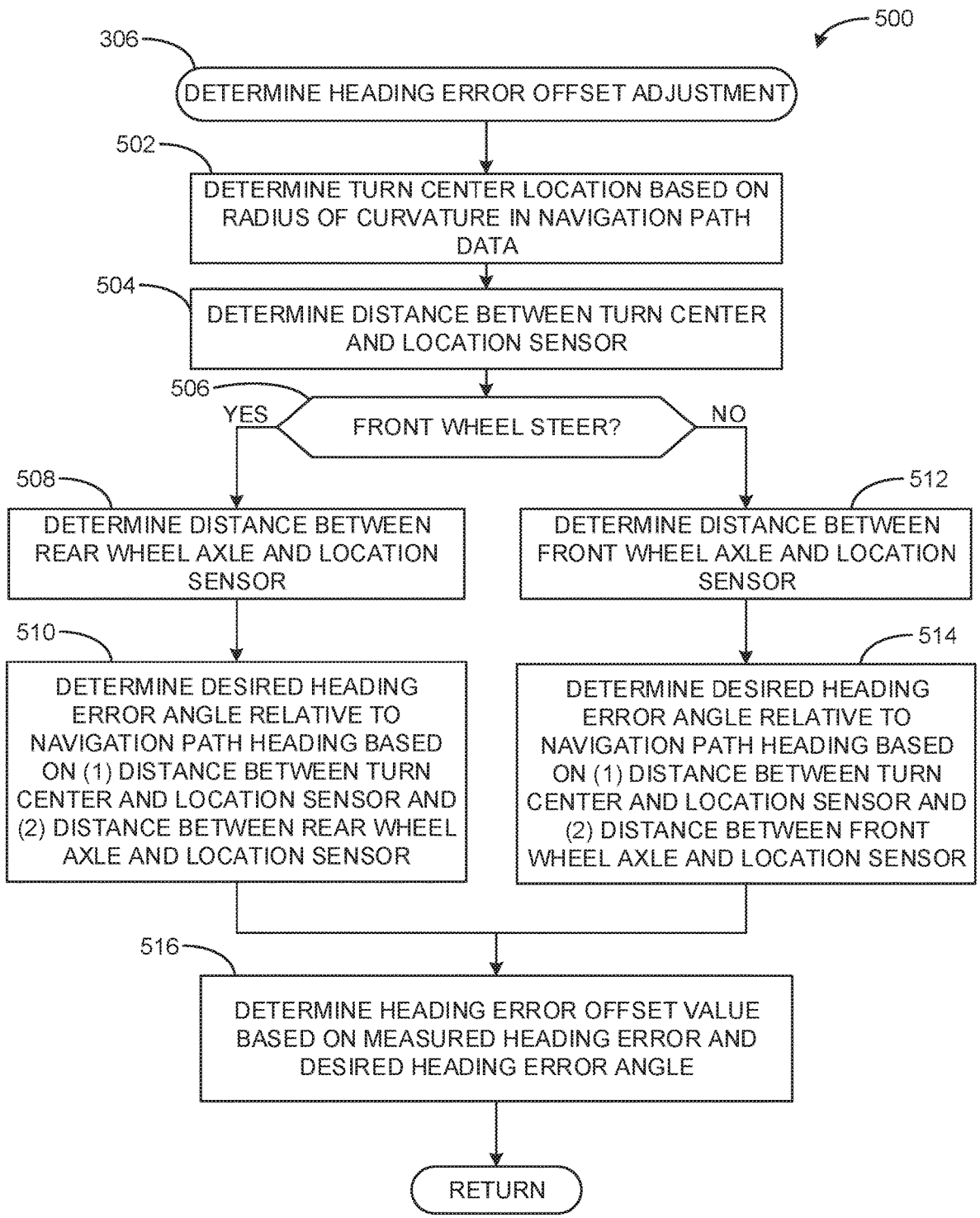
FIG. 5 is a flowchart representative of example machine readable instructions that may be executed to implement the tracking mode controller of FIG. 1 to determine a heading error offset adjustment.

Flowcharts representative of example hardware logic, machine readable instructions, hardware implemented state machines, and/or any combination thereof for implementing the tracking mode controller 116 of FIG. 2 are shown in FIGS. 3-5. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3-5, many other methods of implementing the example tracking mode controller 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, cot pining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc, in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone. (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example machine readable instructions 300 that may be executed by the tracking mode controller 116 of FIGS. 1 and 2 to cause a vehicle to follow a curved path are illustrated in FIG. 3. With reference to the preceding figures and associated descriptions, the example machine readable instructions 300 of FIG. 3 begin with the example tracking mode controller 116 accessing navigation path data, vehicle location data, and vehicle parameter data (Block 302). In some examples, the navigation analyzer 208 accesses navigation path data, vehicle location data, and vehicle parameter data. For example, the navigation path data and/or the vehicle location data may be accessed from the navigation manager 114 of the vehicle control network 104. In some examples, the vehicle parameter data may be accessed from the vehicle data interface 112 of the vehicle control network 104.

At block 304, the example tracking mode controller 116 determines a feedforward wheel angle. In some examples, the feedforward wheel angle determiner 210 determines a feedforward wheel angle. Detailed instructions to determine a feedforward wheel angle are illustrated and described in connection with FIG. 4.

At block 306, the example tracking mode controller 116 determines a heading error offset adjustment. In some examples, the heading error offset determiner 214 determines a heading error offset adjustment. Detailed instructions to determine a heading error offset adjustment are illustrated and described in connection with FIG. 5.

At block 308, the example tracking mode controller 116 controls the vehicle 102 to reduce control errors and follow the feedforward wheel angle. In some examples, the steering controller 218 controls the vehicle 102 to reduce control errors and follow the feedforward wheel angle. For example, the steering controller 218 can generate the steering commands 118 to cause the vehicle 102 to follow a prescribed curved path.

At block 310, the example tracking mode controller 116 determines whether to continue the tracking operation. For example, the tracking mode controller 116 may determine whether to continue the tracking operation based on whether the navigation analyzer 208 determines the vehicle is aligned with one or more prescribed paths and/or based on a user input. In response to continuing the tracking operation, processing transfers to block 302. Conversely, in response to not continuing the tracking operation, processing terminates.

Example machine readable instructions 400 that may be executed by the tracking mode controller 116 of FIGS. 1 and 2 to determine a feedforward wheel angle are illustrated in FIG. 4. With reference to the preceding figures and associated descriptions, the example machine readable instructions 400 of FIG. 4 begin with the example tracking mode controller 116 determining a turn center location based on a radius of curvature in navigation path data (Block 402). In some examples, the feedforward wheel angle determiner 210 determines a turn center location based on a radius of curvature in navigation path data. For example, the navigation path data 206 accessed by the navigation analyzer 208 can be utilized to determine a turn center location at a current location a location along the navigation path corresponding to the location represented in the vehicle location data 202). In some examples, the navigation analyzer 208 determines a turn center location based on the radius of curvature in the navigation path data.

At block 404, the example tracking mode controller 116 determines a vehicle wheel base distance. In some examples, the vehicle data 204 includes a vehicle wheel base distance representing a distance between a front axle of the vehicle and a rear axle of the vehicle. In some examples, the navigation analyzer 208 determines the vehicle wheel base distance based on the vehicle data 204.

At block 406, the example tracking mode controller 116 determines a distance between the turn center location and the location sensor 105. In some examples, the navigation analyzer 208 determines a distance between the turn center location and the location sensor 105. In some examples, the feedforward wheel angle determiner 210 determines a distance between the turn center location and the location sensor 105. In some examples, the feedforward wheel angle determiner 210 calculates the distance between the turn center location and the location sensor 105 using equation 1.

At block 408, the example tracking mode controller 116 determines whether the vehicle is a front wheel steer vehicle. In some examples, the navigation analyzer 208 determines whether the vehicle is a front wheel steer vehicle based on the vehicle data 204. In response to the vehicle being a front wheel steer vehicle, processing transfers to block 410. Conversely, in response to the vehicle not being a front wheel steer vehicle (i.e., being instead a rear wheel steer vehicle), processing transfers to block 416.

At block 410, the example tracking mode controller 116 determines a distance from the turn center location to the rear axle. In some examples, the feedforward wheel angle determiner 210 determines a distance from the turn center location to the rear axle. In some examples, the feedforward wheel angle determiner 210 uses equation 2b to determine a distance from the turn center location to the rear axle.

At block 412, the example tracking mode controller 116 determines a first angle between the vehicle wheel base line and a line extending from the rear axle to the turn center location. In some examples, the feedforward wheel angle determiner 210 determines a first angle between the vehicle wheel base line and a line extending from the rear axle to the turn center. In some examples, the feedforward wheel angle determiner 210 determines the first angle between the vehicle wheel base line and a line extending from the rear axle to the turn center using equation 3b and/or another trigonometric relationship.

At block 414, the example tracking mode controller 116 determines a front wheel steer angle based on the first angle. In some examples, the feedforward wheel angle determiner 210 determines the front wheel steer angle based on the first angle (calculated at block 412) using equation 4.

At block 416, the example tracking mode controller 116 determines a distance from the turn center location to the front axle. In some examples, the feedforward wheel angle determiner 210 determines a distance from the turn center location to the front axle. In some examples, the feedforward wheel angle determiner 210 uses equation 2a to determine a distance from the turn center location to the front axle.

At block 418, the example tracking mode controller 116 determines a first angle between the vehicle wheel base line and a line extending from the front axle to the turn center location. In some examples, the feedforward wheel angle determiner 210 determines a first angle between the vehicle wheel base line and a line extending from the front axle to the turn center. In some examples, the feedforward wheel angle determiner 210 determines the first angle between the vehicle wheel base line and a line extending from the front axle to the turn center using equation 3a and/or another trigonometric function.

At block 420, the example tracking mode controller 116 determines a rear wheel steer angle based on the first angle. In some examples, the feedforward wheel angle determiner 210 determines the rear wheel steer angle based on the first angle (calculated at block 418) using equation 4.

Example machine readable instructions 500 that may be executed by the tracking mode controller 116 of FIGS. 1 and 2 to determine a heading error offset adjustment are illustrated in FIG. 5. With reference to the preceding figures and associated descriptions, the example machine readable instructions 500 of FIG. 5 begin with the example tracking mode controller 116 determining a turn center location based on a radius of curvature in the navigation path data (Block 502). In some examples, the heading error offset determiner 214 determines a turn center location based on a radius of curvature in navigation path data. For example, the navigation path data 206 accessed by the navigation analyzer 208 can be utilized to determine a turn center location at a current location (e.g., a location along the navigation path corresponding to the location represented in the vehicle location data 202). In some examples, the navigation analyzer 208 determines a turn center location based on the radius of curvature in the navigation path data.

At block 504, the example tracking mode controller 116 determines a distance between the turn center location and the location sensor 105. In some examples, the navigation analyzer 208 determines a distance between the turn center location and the location sensor 105. In some examples, the feedforward wheel angle determiner 210 determines a distance between the turn center location and the location sensor 105. In some examples, the feedforward wheel angle determiner 210 calculates the distance between the turn center location and the location sensor 105 using equation 1.

At block 506, the example tracking mode controller 116 determines whether the vehicle is a front wheel steer vehicle. In some examples, the navigation analyzer 208 determines whether the vehicle is a front wheel steer vehicle based on the vehicle data 204. In response to the vehicle being a front wheel steer vehicle, processing transfers to block 508. Conversely, in response to the vehicle not being a front wheel steer vehicle (i.e., being instead a rear wheel steer vehicle), processing transfers to block 512.

At block 508, the example tracking mode controller 116 determines a distance between the rear wheel axle and the location sensor 105. In some examples, the heading error offset determiner 214 determines a distance between the rear wheel axle and the location sensor 105.

At block 510, the example tracking mode controller 116 determines a desired heading error angle relative to the navigation path heading based on (1) the distance between the turn center location and the location sensor 105 and (2) the distance between the rear wheel axle and the location sensor 105. In some examples, the heading error offset determiner 214 uses equation 5b to determine the desired heading error angle relative to the navigation path heading based on (1) the distance between the turn center location and the location sensor 105 and (2) the distance between the rear wheel axle and the location sensor 105.

At block 512, the example tracking mode controller 116 determines a distance between the front wheel axle and the location sensor 105. In some examples, the heading error offset determiner 214 determines a distance between the front wheel axle and the location sensor 105.

At block 514, the example tracking mode controller 116 determines a desired heading error angle relative to the navigation path heading based on (1) the distance between the turn center location and the location sensor 105 and (2) the distance between the front wheel axle and the location sensor 105. In some examples, the heading error offset determiner 214 uses equation 5a to determine the desired heading error angle relative to the navigation path heading based on (1) the distance between the turn center location and the location sensor 105 and (2) the distance between the front wheel axle and the location sensor 105.

At block 514, the example tracking mode controller 116 determines a heading error offset value based on a measured heading error and the desired heading error angle. In some examples, the heading error offset determiner 214 determines the heading error offset value based on the measured heading error and the desired heading error angle. In some examples, the heading error offset determiner 214 uses equation 6 to determine the heading error offset value based on the measured heading error and the desired heading error angle.

Figure 6A:
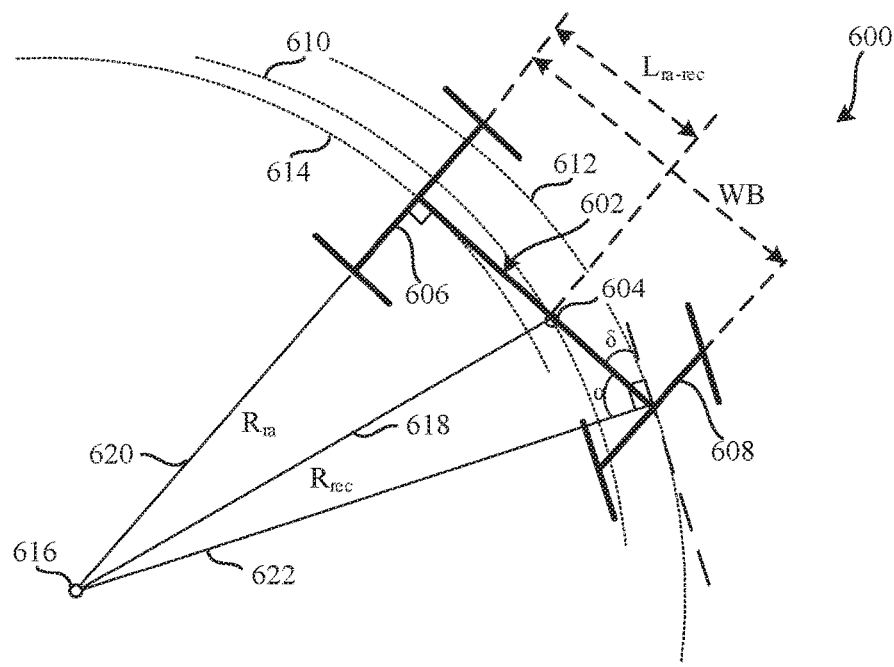
FIG. 6A is an example schematic corresponding to a calculation of a feedforward wheel angle for a front wheel steer vehicle as calculated in accordance with teachings disclosed herein.

FIG. 6A is an example schematic 600 corresponding to a calculation of a feedforward wheel angle for a front wheel steer vehicle as calculated in accordance with teachings disclosed herein. The schematic 600 includes an example front wheel steer vehicle 602. For example, the front wheel steer vehicle 602 may be the front wheel steer vehicle 102a of FIG. 1.

The front wheel steer vehicle 602 includes an example location sensor 604. The location sensor 604 is located between an example rear axle 606 of the vehicle and an example front axle 608. For example, the location sensor 604 can be a GNSS receiver.

As illustrated in FIG. 6A, the front wheel steer vehicle 602 is in a tracking mode following a prescribed curved path. When the front wheel steer vehicle 602 follows a prescribed curved path, the front axle 608, the rear axle 606, and the location sensor 604 all follow different curved paths (e.g., an example location sensor path 610, an example front axle path 612, and an example rear axle path 614). In tracking mode, the tracking mode controller 116 of FIGS. 1 and 2 attempts to cause the location sensor 604 to follow the location sensor path 610.

In FIG. 6A, the front wheel steer vehicle 602 turns about an example turn center location 616. The tracking mode controller 116 can determine the turn center location 616 based on the navigation path data 206 and the current vehicle location (e.g., as represented in the vehicle location data 202). The tracking mode controller 116 can determine a length of a first segment 618 ($R_{rec}$) from the turn center location 616 to the location sensor 604 using equation 1 as previously described and reprinted below for reference.

$$R_{rec} = \frac{1}{|\rho|} \quad \text{Equation 1}$$

Similarly, the tracking mode controller 116 can determine a length of an example second segment 620 between the turn center location 616 and the rear axle 606. For example, the tracking mode controller 116 can use equation 2b as previously described (reprinted below for reference) to calculate the length of the second segment 620 based on the length of the first segment 618 and the distance between the rear axle 606 and the location sensor 604. The first segment 618, the second segment 620, and the line from the location sensor 604 to the rear axle 606 form a right triangle, and therefore the length of the second segment 620 can be determined using Pythagorean theorem.

$$R_{ra} = \sqrt{R_{rec}^2 - L_{ra\text{-}rec}^2} \quad \text{Equation 2b}$$

After determining the length of the second segment 620, the angle α between an example third segment 622 extending from the turn center location 616 to the front axle 608 and the centerline of the front wheel steer vehicle 602 (e.g., the line connecting the rear axle 606 and the front axle 608) can be determined using equation 3b as previously described (repeated below for reference).

$$\alpha = \tan^{-1}\left(\frac{R_{ra}}{WB}\right) \quad \text{Equation 3b}$$

Finally, the tracking mode controller 116 can determine the feedforward steering angle by using equation 4 (reprinted below for reference). The output of equation 4, δ, represents the angle at which to steer the front axle 608 of the front wheel steer vehicle 602 in order for the location sensor 604 to follow the location sensor path 610.

$$\delta = (90° - \alpha) \times \text{sign}(\rho) \quad \text{Equation 4}$$

In Equation 4, the angle calculated as ninety degrees minus α is multiplied by the path curvature value. In Equation 4, the variable sign(ρ) represents a negative or positive sign that is assigned to the path curvature value by the example location sensor 604.

The tracking mode controller 116 of FIG. 1 calculates the feedforward steering angle (e.g., δ) by assuming slippage does not occur with respect to the wheels of the front wheel steer vehicle 602 (e.g., the rear wheel 110 and/or the front wheel 108 of FIG. 1). The tracking mode controller 116 of FIG. 1 calculates the initial feedforward steering angle (e.g., δ) which causes the front wheels (e.g., the front wheel 108 of FIG. 1) of the front wheel steer vehicle 602 to turn in a direction that causes the front wheel steer vehicle 602 to follow the location sensor path 610. In some examples, the feedforward steering angle (e.g., δ) is calculated once, and further calculations are required in subsequent operations to keep the front wheel steer vehicle 602 on a prescribed path.

Figure 6B:
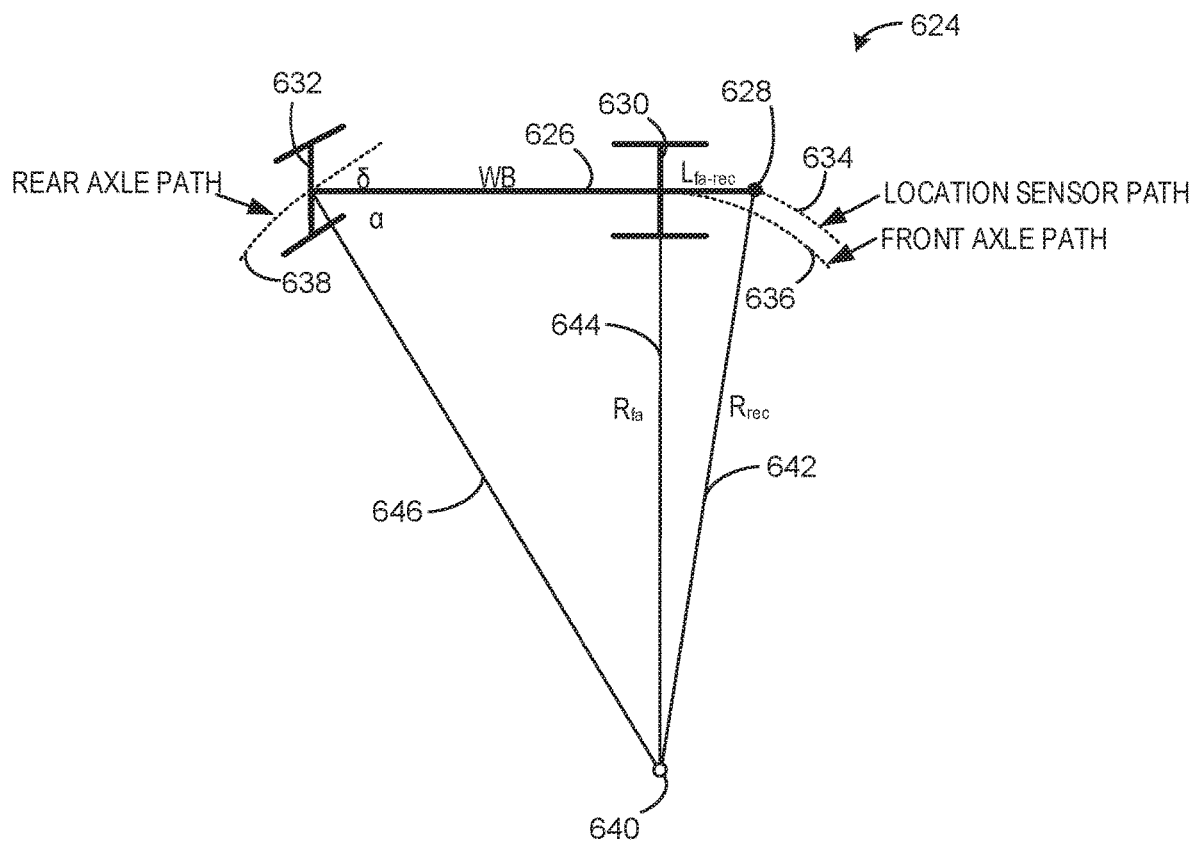
FIG. 6B is an example schematic corresponding to a calculation of a feedforward wheel angle for a rear wheel steer vehicle as calculated in accordance with teachings disclosed herein.

FIG. 6B is an example schematic 624 corresponding to a calculation of a feedforward wheel angle for an example rear wheel steer vehicle 626 as calculated in accordance with teachings disclosed herein. For example, the rear wheel steer vehicle 626 may be the rear wheel steer vehicle 102b of FIG. 1.

The rear wheel steer vehicle 626 includes an example location sensor 628. The location sensor 628 is located further toward a front end of the vehicle than an example front axle 630. For example, the location sensor 628 can be a GNSS receiver.

As illustrated in FIG. 6B, the rear wheel steer vehicle 626 is in a tracking mode following a prescribed curved path. When the rear wheel steer vehicle 626 follows a prescribed curved path, the front axle 630, an example rear axle 632, and the location sensor 628 all follow different curved paths (e.g., an example location sensor path 634, an example front axle path 636, and an example rear axle path 638). In tracking mode, the tracking mode controller 116 of FIGS. 1 and 2 attempts to cause the location sensor 628 to follow the location sensor path 634.

In FIG. 6B, the rear wheel steer vehicle 626 turns about an example turn center location 640. The tracking mode controller 116 can determine the turn center location 640 based on the navigation path data 206 and the current vehicle location e.g., as represented in the vehicle location data 202). The tracking mode controller 116 can determine a length of a fourth segment 642 ($R_{rec}$) from the turn center location 640 to the location sensor 628 using equation 1 as previously described and reprinted below for reference.

$$R_{rec} = \frac{1}{|\rho|} \quad \text{Equation 1}$$

Similarly, the tracking mode controller 116 can determine a length of an example fifth segment 644 between the turn center location 640 and the front axle 630. For example, the tracking mode controller 116 can use equation 2a as previously described (reprinted below for reference) to calculate the length of the fifth segment 644 based on the length of the fourth segment 642 and the distance between the front axle 630 and the location sensor 628. The fourth segment 642, the fifth segment 644, and the line from the location sensor 628 to the front axle 630 form a right triangle, and therefore the length of the fifth segment 644 can be determined using Pythagorean theorem.

$$R_{fa} = \sqrt{R_{rec}^2 - L_{fa\text{-}rec}^2} \quad \text{Equation 2a}$$

After determining the length of the fifth segment 644, the angle α between an example sixth segment 646 extending from the turn center location 640 to the rear axle 632 and the centerline of the rear wheel steer vehicle 626 (e.g., the line connecting the rear axle 632 and the front axle 630) can be determined using equation 3a as previously described (repeated below for reference).

$$\alpha = \tan^{-1}\left(\frac{R_{fa}}{WB}\right) \quad \text{Equation 3a}$$

Finally, the tracking mode controller 116 can determine the feedforward steering angle by using equation 4 (reprinted below for reference). The output of equation 4, δ, represents the angle at which to steer the front axle 630 of the rear wheel steer vehicle 626 in order for the location sensor 628 to follow the location sensor path 634.

$$\delta = (90° - \alpha) \times \text{sign}(\rho) \quad \text{Equation 4}$$

In Equation 4, the angle calculated as ninety degrees minus a is multiplied by the path curvature value. In Equation 4, the variable sign (ρ) represents a negative or positive sign that is assigned to the path curvature value by the example location sensor 628.

The tracking mode controller 116 of FIG. 1 calculates the feedforward steering angle (e.g., δ) by assuming slippage does not occur with respect to the wheels of the rear wheel steer vehicle 626 (e.g., the rear wheel 110 and/or the front wheel 108 of FIG. 1). The tracking mode controller 116 of FIG. 1 calculates the initial feedforward steering angle (e.g., δ) which causes the front wheels (e.g., the front wheel 108 of FIG. 1) of the rear wheel steer vehicle 626 to turn in a direction that causes the rear wheel steer vehicle 626 to follow the location sensor path 634. In some examples, the feedforward steering angle (e.g., δ) is calculated once, and further calculations are required in subsequent operations to keep the rear wheel steer vehicle 626 on a prescribed path.

Figure 7A:
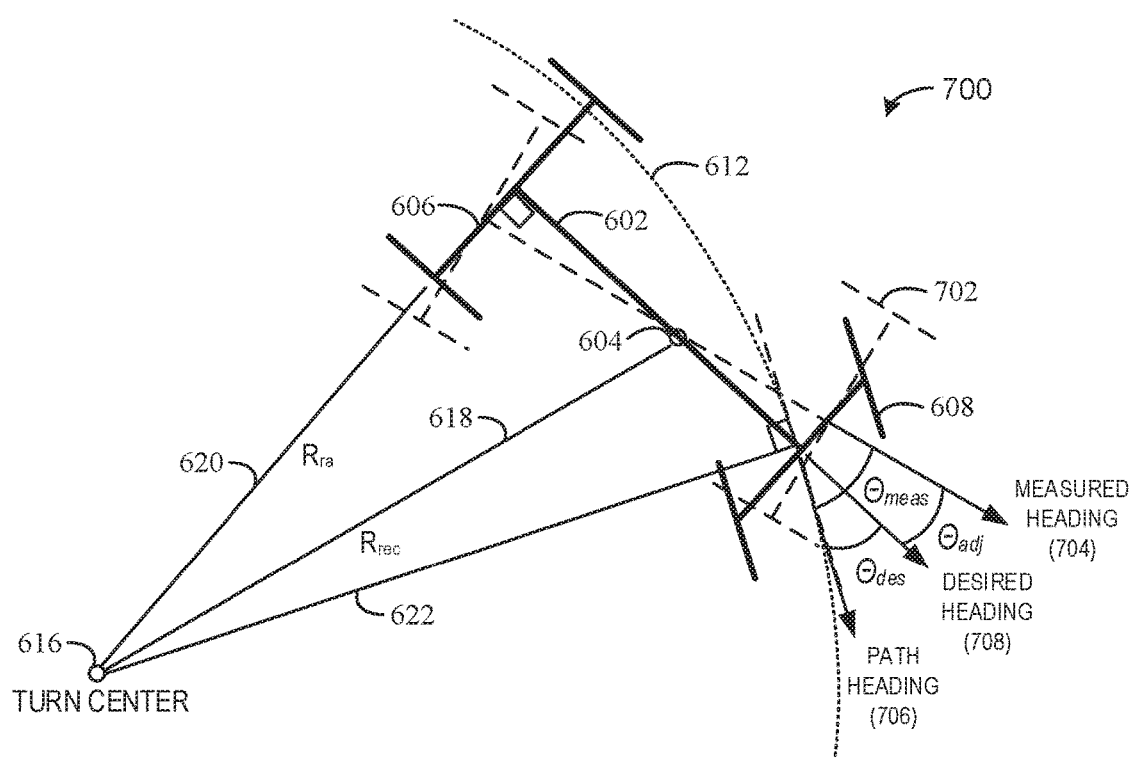
FIG. 7A is an example schematic corresponding to a calculation of a heading error offset adjustment for a front wheel steer vehicle as calculated in accordance with techniques disclosed herein.

FIG. 7A is an example schematic 700 corresponding to a calculation of a heading error offset adjustment for the front wheel steer vehicle 602 vehicle of FIG. 6A as calculated in accordance with techniques disclosed herein. As in FIG. 6A, the front wheel steer vehicle 602 includes the rear axle 606, the front axle 608, and the location sensor 604 disposed between the rear axle 606 and the front axle 608. Further, similar to FIG. 6A, the tracking mode controller 116 can calculate the turn center location 616, a length of the first segment 618 ($R_{rec}$), a length of the second segment 620 ($R_{ra}$), and a length of the third segment 622.

FIG. 7A illustrates an example disturbed vehicle configuration 702, illustrated by dashed lines. The disturbed vehicle configuration 702 represents the vehicle being offset from a desired orientation. For example, the front wheel steer vehicle 602 may start in the disturbed vehicle configuration 702 and transition to the orientation of the front wheel steer vehicle 602 illustrated by solid lines after adjusting control values to reduce a heading error value.

The schematic 700 includes an example measured heading 704. The measured heading 704 corresponds to a heading (e.g., orientation) of the front wheel steer vehicle 602 when in the disturbed vehicle configuration 702. The schematic 700 includes an example path heading 706, corresponding to a direction of the prescribed curve path for the front axle 608 at the current location of the front wheel steer vehicle 602. In some examples, the path heading 706 is determined based on the navigation path data 206 accessed at the navigation analyzer 208. The angular difference between the measured heading 704 and the path heading 706 is referred to as heading error. Using conventional techniques, if the vehicle steering was controlled to reduce the heading error to zero to align the vehicle precisely with the path heading 706), performance will be degraded. Therefore, in accordance with techniques disclosed herein, the tracking mode controller 116 calculates a heading error offset adjustment ($\theta_{adj}$) to cause the front wheel steer vehicle 602 to be aligned with an example desired heading 708.

To calculate the heading error offset adjustment, the tracking mode controller 116 first calculates a desired heading angle ($\theta_{des}$) between the measured heading 704 and the desired heading 708, For example, the tracking mode controller 116 can calculate the desired heading angle ($\theta_{des}$) based on knowledge of the distance between the rear axle and the location sensor 604 ($L_{ra-rec}$) and based on a length of a distance between the location sensor 604 and the turn center location 616 ($R_{rec}$). The tracking mode controller 116 can utilize equation 5b to calculate the desired heading angle, as previously described (reprinted below for reference).

$$\theta_{des} = -\sin^{-1}\left(\frac{L_{ra-rec}}{R_{rec}}\right) \times \text{sign}(\rho) \quad \text{Equation 5b}$$

While equation 5b represents one possible trigonometric relationship that can be utilized to determine the desired heading angle, any one or more measurements and any one or more trigonometric relationships can be utilized by the tracking mode controller 116 to determine the desired heading angle.

After calculating the desired heading angle, the tracking mode controller 116 can calculate the heading error offset adjustment value ($\theta_{adj}$) using the previously described equation 6 (reprinted below for reference). Equation 6 subtracts the desired heading angle from the measured heading angle. When the tracking mode controller 116 uses the heading error offset adjustment value and reduces any heading error in excess of this value to zero, the vehicle becomes aligned with the desired heading 708.

$$\theta_{adj} = \theta_{meas} - \theta_{des} \quad \text{Equation 6}$$

Figure 7B:
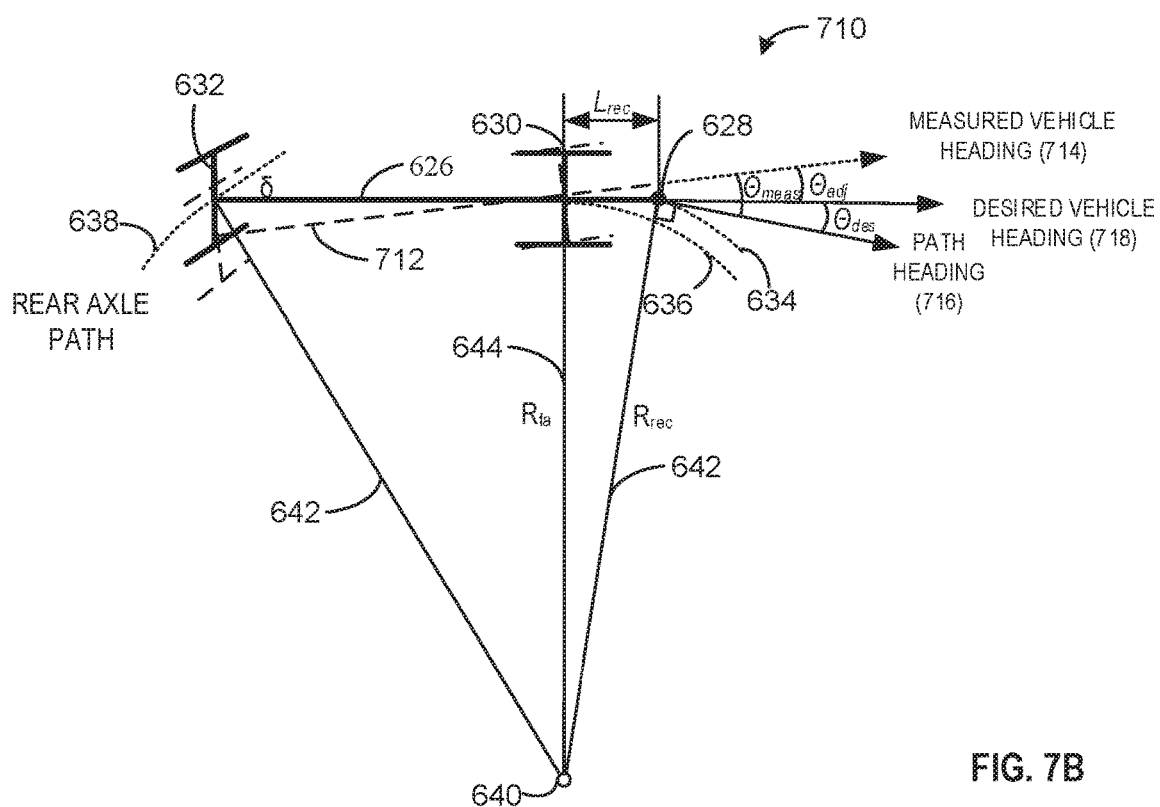
FIG. 7B is an example schematic corresponding to a calculation of a heading error offset adjustment for a rear wheel steer vehicle as calculated in accordance with techniques disclosed herein.

FIG. 7B is an example schematic 710 corresponding to a calculation of a heading error offset adjustment for the rear wheel steer vehicle 626 of FIG. 6B as calculated in accordance with techniques disclosed herein.

As in FIG. 6B, the rear wheel steer vehicle 626 includes the rear axle 632, the front axle 630, and the location sensor 628 disposed at a front end of the rear wheel steer vehicle 626. Further, similar to FIG. 6B, the tracking mode controller 116 can calculate the turn center location 640, a length of the fourth segment 642 ($R_{rec}$), a length of the fifth segment 644 ($R_{fa}$), and a length of the sixth segment 646.

FIG. 7B illustrates an example disturbed vehicle configuration 712, illustrated by dashed lines. The disturbed vehicle configuration 712 represents the vehicle being offset from a desired orientation. For example, the rear wheel steer vehicle 626 may start in the disturbed vehicle configuration 712 and transition to the orientation of the rear wheel steer vehicle 626 illustrated by solid lines after adjusting control values to reduce a heading error value.

The schematic 710 includes an example measured heading 714. The measured heading 714 corresponds to a heading (e.g., orientation) of the rear wheel steer vehicle 626 when in the disturbed vehicle configuration 702. The schematic 710 includes an example path heading 716, corresponding to a direction of the prescribed curve path at the location sensor 628. In some examples, the path heading 716 is determined based on the navigation path data 206 accessed at the navigation analyzer 208. The angular difference between the measured heading 714 and the path heading 716 is referred to as heading error. Using conventional techniques, if the vehicle steering was controlled to reduce the heading error to zero (e.g., to align the vehicle precisely with the path heading 716), performance will be degraded. Therefore, in accordance with techniques disclosed herein, the tracking mode controller 116 calculates a heading error offset adjustment ($\theta_{adj}$) to cause the rear wheel steer vehicle 626 to be aligned with an example desired heading 718.

To calculate the heading error offset adjustment, the tracking mode controller 116 first calculates a desired heading angle ($\theta_{des}$) between the measured heading 714 and the desired heading 718. For example, the tracking mode controller 116 can calculate the desired heading angle ($\theta_{des}$) based on knowledge of the distance between the front axle and the location sensor 628 ($L_{fa-rec}$) and based on a length of a distance between the location sensor 628 and the turn center location 640 ($R_{rec}$). The tracking mode controller 116 can utilize equation 5a to calculate the desired heading angle, as previously described (reprinted below for reference).

$$\theta_{des} = -\sin^{-1}\left(\frac{L_{fa-rec}}{R_{rec}}\right) \times \text{sign}(\rho) \qquad \text{Equation 5a}$$

While equation 5a represents one possible trigonometric relationship that can be utilized to determine the desired heading angle, any one or more measurements and any one or more trigonometric relationships can be utilized by the tracking mode controller 116 to determine the desired heading angle.

After calculating the desired heading angle, the tracking mode controller 116 can calculate the heading error offset adjustment value ($\theta_{adj}$) using the previously described equation 6 (reprinted below for reference).

$$\theta_{adj}\theta_{meas} - \theta_{des} \qquad \text{Equation 6}$$

In some examples, the prescribed curved path for a vehicle to follow may be S-shaped, a circle or half-circle shaped, or any other form of a curve. In this manner, the tracking mode controller 116 of FIG. 1 may perform Equations 1-6 any number of times depending on the shape of the curve. For example, if the prescribed curved path is S-shaped, the tracking mode controller 116 of FIG. 1 determines the feedforward steering angle (e.g., δ) and the adjusted heading error (e.g., $\theta_{ADJ}$) a first time at the first turn and a second time at the second turn, since the two turns curve in the opposite direction. In some examples, the tracking mode controller 116 continually adjusts the feedforward steering angle and/or the adjusted heading error any time a curvature of the prescribed curved path changes.

Figure 8:
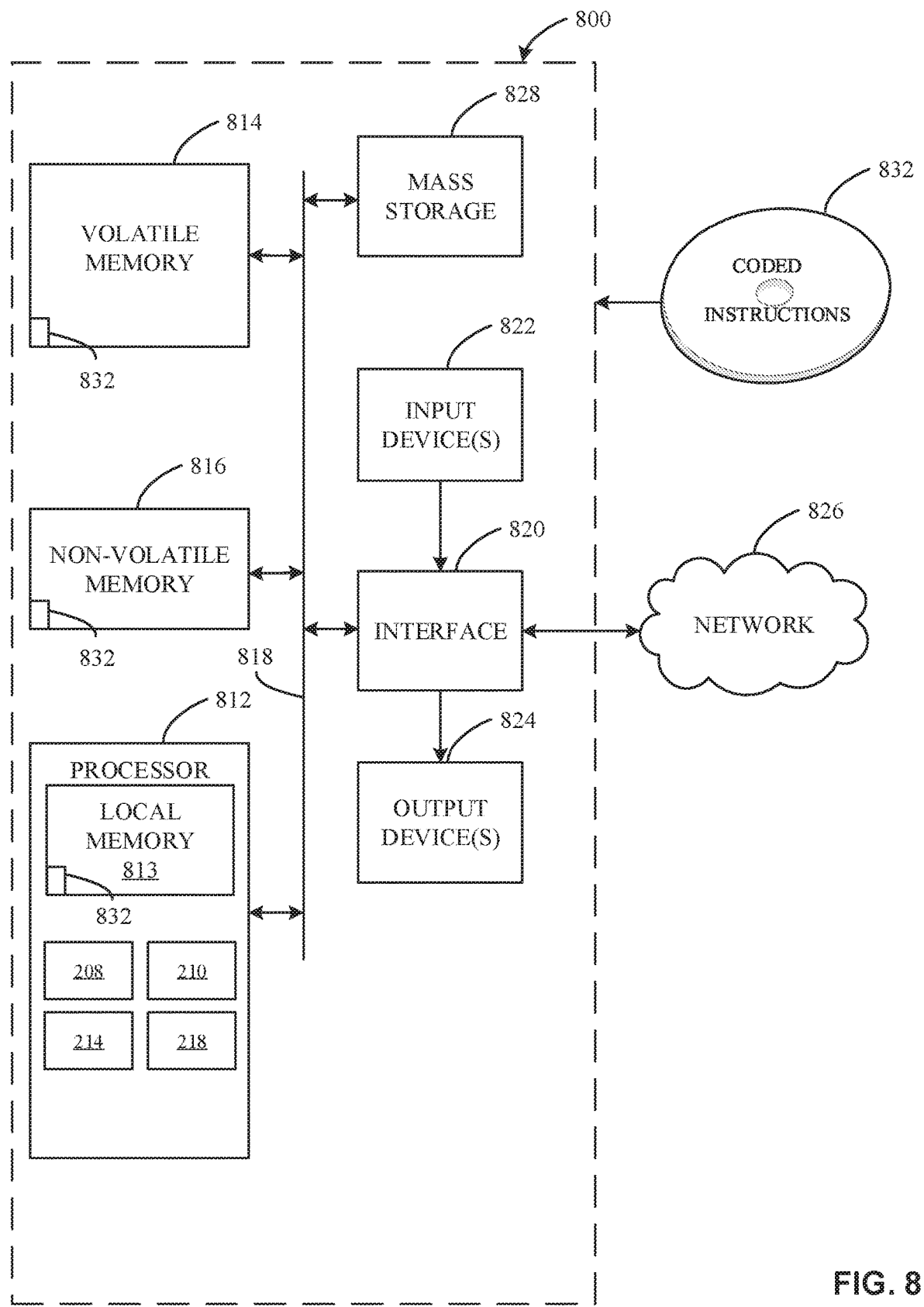
FIG. 8 is a block diagram of an example processing platform structured to execute the instructions of FIGS. 3-5 to implement the tracking mode controller of FIGS. 1 and 2.

FIG. 8 is a block diagram of an example processor platform 800 structured to execute the instructions of FIGS. 3-5 to implement the tracking mode controller 116 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example navigation analyzer 208, the example feedforward wheel angle determiner 210, the example heading error offset determiner 214, and the example steering controller 218.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (MED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 300, 400, 500, 832 of FIGS. 3-5 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that determine a commanded front wheel angle and heading error offset, in real time, to command a vehicle to follow a prescribed curved path. The disclosed methods, apparatus and articles of manufacture improve the efficiency of conventional methods to calculate a commanded wheel angle to follow a prescribed curved path by eliminating the need to tune the vehicle in a field of operation by utilizing vehicle kinematics and geometric principles to calculate an accurate heading error and wheel angle based on the prescribed path curvature value.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising
a navigation analyzer to:
determine a turn center location based on a radius of curvature for a curved navigation path for a vehicle to follow;
determine a distance between the turn center location and at least one of a front axle or a rear axle of the vehicle; and
determine a distance between a location sensor and a turn center location;
a feedforward wheel angle determiner to determine a wheel steering angle based on (1) the distance between the turn center location and the at least one of the front axle or the rear axle and (2) a distance between the front axle and the rear axle;
a heading error offset determiner to determine a heading error offset adjustment based on (1) the distance between the location sensor and the turn center location and (2) a distance between the location sensor and at least one of the front axle or the rear axle; and
a steering controller to cause a vehicle to follow the curved navigation path based on the wheel steering angle and the heading error offset adjustment.

2. The apparatus of claim 1, wherein the vehicle is a rear wheel steer vehicle.

3. The apparatus of claim 2, wherein the location sensor is positioned further toward a front end of the vehicle than the front axle.

4. The apparatus of claim 3, wherein the feedforward wheel angle determiner is to determine the wheel steering angle based on the distance between the turn center location and the front axle.

5. The apparatus of claim 4, wherein the steering controller is to communicate steering commands to a rear wheel steering apparatus.

6. The apparatus of claim 1, wherein the vehicle is a front wheel steer vehicle.

7. The apparatus of claim 6, wherein the location sensor is positioned between the front axle and the rear axle.

8. The apparatus of claim 7, wherein the feedforward wheel angle determiner is to determine the wheel steering angle based on the distance between the turn center location and the rear axle.

9. The apparatus of claim 8, wherein the steering controller is to communicate steering commands to a front wheel steering apparatus.

10. The apparatus of claim 1, wherein the steering controller is to adjust a control gain value to reduce a heading error value in excess of the heading error offset adjustment.

11. A computer readable storage medium comprising computer readable instructions that, when executed, cause at least one processor to at least:
determine a turn center location based on a radius of curvature for a curved navigation path for a vehicle to follow;
determine a distance between the turn center location and at least one of a front axle or a rear axle of the vehicle;
determine a distance between a location sensor and a turn center location;
determine a wheel steering angle based on (1) the distance between the turn center location and the at least one of the front axle or the rear axle and (2) a distance between the front axle and the rear axle;
determine a heading error offset adjustment based on (1) the distance between the location sensor and the turn center location and (2) a distance between the location sensor and at least one of the front axle or the rear axle; and
cause a vehicle to follow the curved navigation path based on the wheel steering angle and the heading error offset adjustment.

12. The computer readable storage medium of claim 11, wherein the instructions, when executed, cause the at least one processor to communicate steering commands to at least one of a front wheel steering apparatus or a rear wheel steering apparatus.

13. The computer readable storage medium of claim 11, wherein the instructions, when executed, cause the at least one processor to adjust a control gain value to reduce a heading error value in excess of the heading error offset adjustment.

14. A vehicle including:
a front axle;
a rear axle;
a location sensor; and
a tracking mode controller to:
determine a wheel steering angle based on (1) a distance between a turn center location corresponding to a navigation curve and at least one of the front axle or the rear axle and (2) a distance between the front axle and the rear axle;
determine a heading error offset adjustment based on (1) a distance between the location sensor and the turn center location and (2) a distance between the location sensor at least one of the front axle or the rear axle; and
cause the vehicle to move along the navigation curve based on the wheel steering angle and the heading error offset adjustment.

15. The vehicle of claim 14, wherein the vehicle is a front wheel steer vehicle.

16. The vehicle of claim 15, wherein the location sensor is positioned between the front axle and the rear axle.

17. The vehicle of claim 14, wherein the vehicle is a rear wheel steer vehicle.

18. The vehicle of claim 15, wherein the location sensor is positioned closer to a front end of the vehicle than the front axle.

19. The vehicle of claim 14, wherein the location sensor is a global navigation satellite system receiver.

20. The vehicle of claim 14, wherein the wheel steering angle and the heading error offset adjustment are determined based on trigonometric functions.

* * * * *